United States Patent [19]

Inoue et al.

[11] Patent Number: 5,442,349

[45] Date of Patent: Aug. 15, 1995

[54] NAVIGATION SYSTEM WITH ROUTE DETERMINATION PROCESS CAPABLE OF DETERMINING A DESIRED ROUTE READILY AND QUICKLY

[75] Inventors: Nobutaka Inoue, Aichi; Jun Uemura, Nagoya; Shigemitsu Toriyama, Yokkaichi, all of Japan

[73] Assignee: Masprodenkoh Kabushikikaisha, Japan

[21] Appl. No.: 122,769

[22] Filed: Sep. 16, 1993

[30] Foreign Application Priority Data

Oct. 12, 1992 [JP] Japan ................................. 4-273082

[51] Int. Cl.6 ............................................ G08G 1/123
[52] U.S. Cl. .................................. 340/995; 340/988; 340/990; 364/444; 364/449
[58] Field of Search ............... 340/995, 990, 996, 905, 340/988; 364/444, 443, 449, 460; 342/457, 357

[56] References Cited

U.S. PATENT DOCUMENTS

| | | | |
|---|---|---|---|
| 4,403,291 | 9/1983 | Von Tomkewitsch | 995/340 |
| 4,550,317 | 10/1985 | Moriyama et al. | 995/340 |
| 4,689,747 | 8/1987 | Kurose et al. | 995/340 |
| 4,796,189 | 1/1989 | Nakayama et al. | 995/340 |
| 4,879,658 | 11/1989 | Takashima et al. | 995/340 |
| 4,882,689 | 11/1989 | Aoki | 995/340 |
| 4,926,336 | 5/1990 | Yamada | 364/449 |
| 4,943,925 | 7/1990 | Moroto et al. | 364/449 |
| 4,951,211 | 8/1990 | DeVilleroche | |
| 5,067,082 | 11/1991 | Nimura et al. | 340/995 |
| 5,121,326 | 6/1992 | Moroto et al. | 995/340 |
| 5,168,452 | 12/1992 | Yamada et al. | 995/340 |
| 5,184,123 | 2/1993 | Bremer et al. | 995/340 |
| 5,220,507 | 6/1993 | Kirson | 995/340 |
| 5,231,584 | 7/1993 | Nimura et al. | 995/340 |
| 5,272,638 | 12/1993 | Martin et al. | 995/340 |
| 5,274,387 | 12/1993 | Kakihara et al. | 451/342 |

FOREIGN PATENT DOCUMENTS

| | | |
|---|---|---|
| 0158214 | 10/1985 | European Pat. Off. . |
| 0323230 | 5/1989 | European Pat. Off. . |
| 0323246 | 7/1989 | European Pat. Off. . |
| 0348528 | 3/1990 | European Pat. Off. . |
| 0485120 | 5/1992 | European Pat. Off. . |
| 63-188517 | 12/1988 | Japan . |
| 1130299 | 5/1989 | Japan . |
| 1136300 | 5/1989 | Japan . |
| 2079453 | 1/1982 | United Kingdom . |
| 2111204 | 6/1983 | United Kingdom . |
| 2238870 | 6/1991 | United Kingdom . |
| 92/08952 | 5/1992 | WIPO . |
| 93/09510 | 5/1993 | WIPO . |

Primary Examiner—Jeffery A. Hopsass
Assistant Examiner—Benjamin C. Lee
Attorney, Agent, or Firm—Davis, Bujold & Streck

[57] ABSTRACT

A navigation system for vehicle is provided with a route determination process by which a route is determined intersection by intersection. When a starting point and driving direction are input, a road is selected, determined as the route to take, and indicated as the route on a display. A further road, of the same category as the road determined, is determined as a further route. Automatic route determination is thus consecutively effected from the starting point toward a destination. When cancellation of the determined route is instructed, the route is canceled intersection by intersection. When the cancellation is finished or if no road can be selected, the navigation system resumes its operation recognizing the end of the determined route newly as starting point.

12 Claims, 8 Drawing Sheets

FIG. 3

| INTERSECTION ADDRESS | $C_1$ | | $C_2$ | | ... | $C_{20}$ | |
|---|---|---|---|---|---|---|---|
| LONGITUDE (x-COORDINATE) | $x_1$ | | $x_2$ | | ... | $x_{20}$ | |
| LATITUDE (y-COORDINATE) | $y_1$ | | $y_2$ | | ... | $y_{20}$ | |
| ADDRESS OF ADJACENT INTERSECTIONS | $C_2$ $C_7$ | $C_{11}$ $C_1$ | $C_3$ | $C_5$ | ... | $C_3$ $C_{21}$ | $C_{25}$ |
| NODE LIST | $N_1$ $N_2$ | | | | ... | | |
| ROAD CATEGORY | 0 | 2 | 0 | 2 | ... | 0 | 2 |
| | $S_1$ | | | | ... | | |
| ROUTE INTERSECTION $p_i$ | $P_1$ | | $P_2$ | | ... | $P_4$ | |

NAVIGATION SYSTEM WITH ROUTE DETERMINATION PROCESS CAPABLE OF DETERMINING A DESIRED ROUTE READILY AND QUICKLY

BACKGROUND OF THE INVENTION

This invention relates to a navigation system for a vehicle by which a route to take is displayed on a CRT screen, liquid crystal display, or other display means to navigate the vehicle. More particularly, this invention relates to such a navigation system provided with a route determination process by which a desired route can be determined readily and quickly.

A known navigation system is provided with a screen on which a road map is displayed. In one type of such a system, a route is determined by pinpointing and thereby inputting intersections consecutively from a base point to a destination by a cursor on the screen or by means of a light pen. In another type of such a system, once a base point and destination are input, a shortest route between the base point and the destination is automatically determined, according to a map data previously stored, and indicated on the map displayed on the screen.

These types of navigation systems, however, have the following shortcomings. While affording a freer selection of route, the former type of system requires meticulous manual labor of designating each intersection. On the other hand, the latter type of system also falls short, in spite of its operation facility, because it uses previously stored and not up-dated program data in determining a route. When an unexpected repair work is undergoing at the automatically selected route, or when the route the user preferred is not selected, the user has to correct the route, after completion of the automatic route determination, in the same laborious manner as in the former type of system.

SUMMARY OF THE INVENTION

Wherefore, an object of this invention is to provide a navigation system for vehicles where and by which a desired route can be readily and quickly determined.

In order to attain the stated object, the navigation system of the present invention includes, as shown in FIG. 1, display means M1, map data storage means M2, display control means M3, direction input means M4, first road selection means M5, second road selection means M6, route indication control means M7, determination means M8, route cancel input means M9, route cancel control means M10, and route determination resumption means M11.

The display means M1 displays a road map thereon.

The map data storage means M2 stores map data to be displayed on the display means M1. The map data includes road category data indicative of the category of each road included in the map data.

The display control means M3 controls the display means M1 to display a road map according to the map data stored in the map data storage means M2.

The direction input means M4 is for inputting a base point and driving direction.

The first road selection means M5 selects, referring to the map data, a road from the designated base point to a next intersection in the designated direction, and determines the road to take as a route.

The second road selection means M6 selects, based on the map data and according to the road category of the determined route, a next road from the end of the determined route to a next intersection, and determines the road to take as a next route.

The route indication control means M7 controls the display means M1 to indicate on the displayed road map the route determined by the first road selection means M5 and second road selection means M6.

The determination means M8 first determines whether or not a route has been determined by the second road selection means M6. If it is determined that route has been determined, the determination means M8 then causes the second road selection means M6 to act so as to determine a further route connecting to the already determined route.

The route cancel input means M9 is for inputting an instruction to halt determination of a route by the first road selection means M5 and the second road selection means M6 and for canceling the determined route.

The route cancel control means M10, responsive to an input instruction to cancel the determined route, cancels the determined route, intersection by intersection, from the end of the determined route toward the base point, and then erases the indication of the route on the displayed road map.

When the determination means M8 determines that the second road selection means M6 has not yet determined a further route or when the route cancel control means M10 has finished canceling a route in response to an instruction to cancel the determined route, the route determination resumption means M11 causes the first road selection means to resume its action upon receipt of an input designating a driving direction, recognizing the end of the uncanceled route newly as a base point.

In operation, a base point and driving direction of the vehicle is input via the direction input means M4. The first road selection means M5 selects, based on the map data stored in the map data storage means M2, a road starting from the input base point and lying in the input driving direction, and determines the road to take as a route from the base point to a next intersection.

Subsequently, the second road selection means M6 selects, based on the map data and the road category data, a road lying ahead of the intersection at the end of the determined route, and determines the road to take as a route from the intersection to the next intersection. When the determination means M8 determines that a route has been determined, the second road selection means M6 is activated again to select a further road connecting to the end of the route determined earlier.

Since selection of a road by the second road selection means M6 is made according to the road category of the route determined earlier, it is possible that there is no corresponding road available in the designated direction and that the second road selection means M6 cannot select a road. Therefore, the present invention activates the determination means M8 to determine whether or not a road selection was effected. Road selection is thus continued, intersection by intersection, by the second road selection means M6 selecting roads according to the category of the road selected first by the first road selection means M5 unless the second road selection means M6 cannot select a road.

Responsive to a determination of route by the first and second road selection means M5 and M6, the route indication control means M7 is activated so as to indicate the determined route on the road map displayed on the display means M1 by the display control means M3.

On the other hand, when a command is input via the route cancel input means M9 to terminate the route determination process being effected by the first and second road selection means M5 and M6 and to cancel the determined route, the route cancel control means M10 is activated so as to cancel the determined route and erase the indication of the route.

If the second road selection means M6 cannot select a road or when the route cancellation is effected by the route cancel control means M10, the route determination resumption means M11 awaits an input via the direction input means M4 designating a driving direction with the end of the determined route as a base point. When a driving direction is input, operation of the first road selection means M5 is resumed.

Thus, if the second road selection means M6 cannot select a road, or when termination of route determination or cancellation of the determined route is effected in response to an instruction from the route cancel input means M9, the end of the route that is not canceled is regarded as a new base point to resume route determination. When the driving direction is input via the direction input means M4, the first and second road selection means M5 and M6 are activated so as to automatically determine a further route starting from the new base point.

BRIEF DESCRIPTION OF THE DRAWINGS

FIG. 3 is a table displaying the intersection data used in determination and indication of a route;

DETAILED DESCRIPTION OF THE PREFERRED EMBODIMENT

Figure 1:
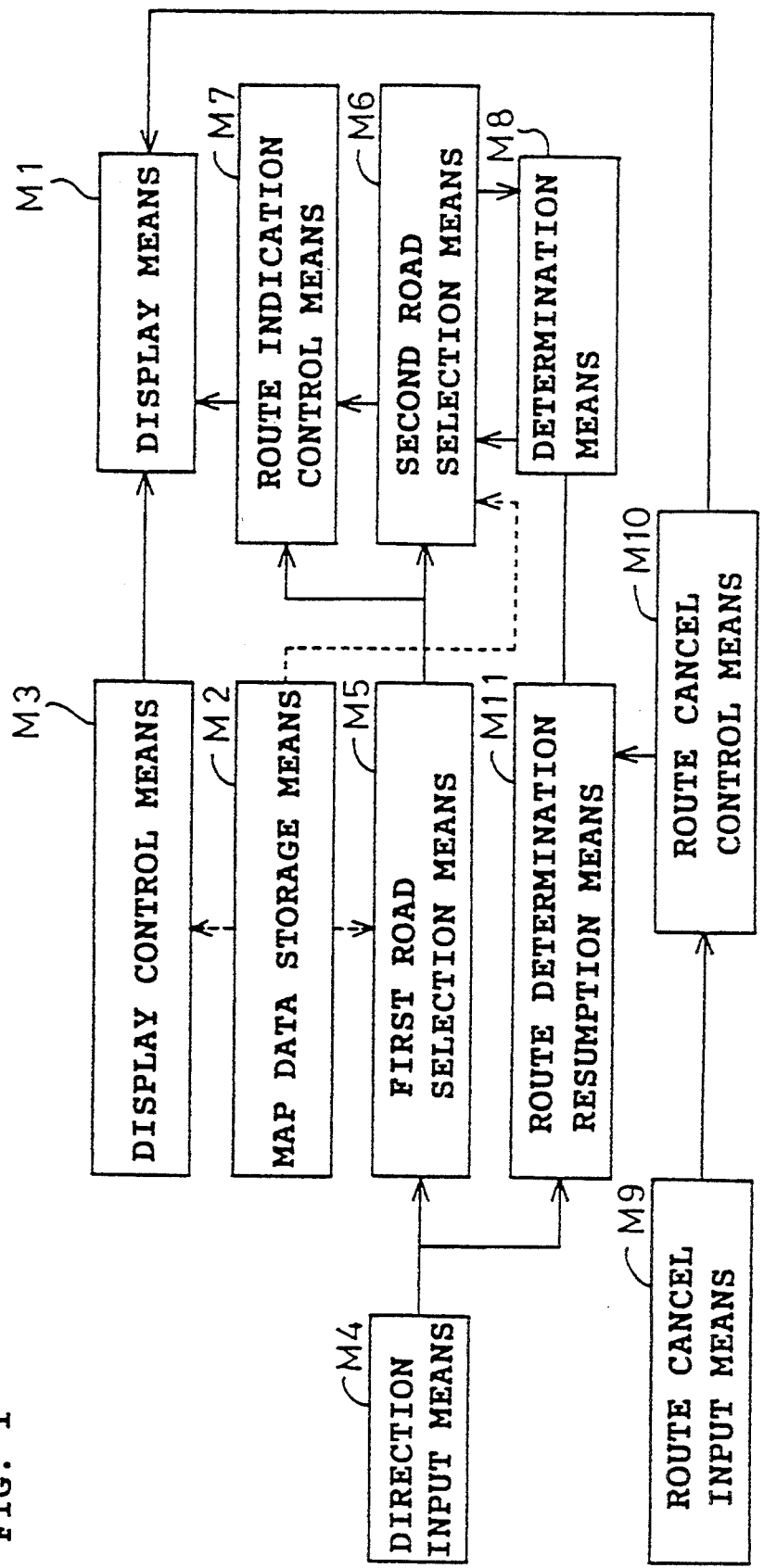
FIG. 1 is a block diagram schematically showing the navigation system of the present invention.

An embodiment of the present navigation system is explained hereunder referring to the drawings although it is understood that other embodiments are within the scope of the present invention.

Figure 2:
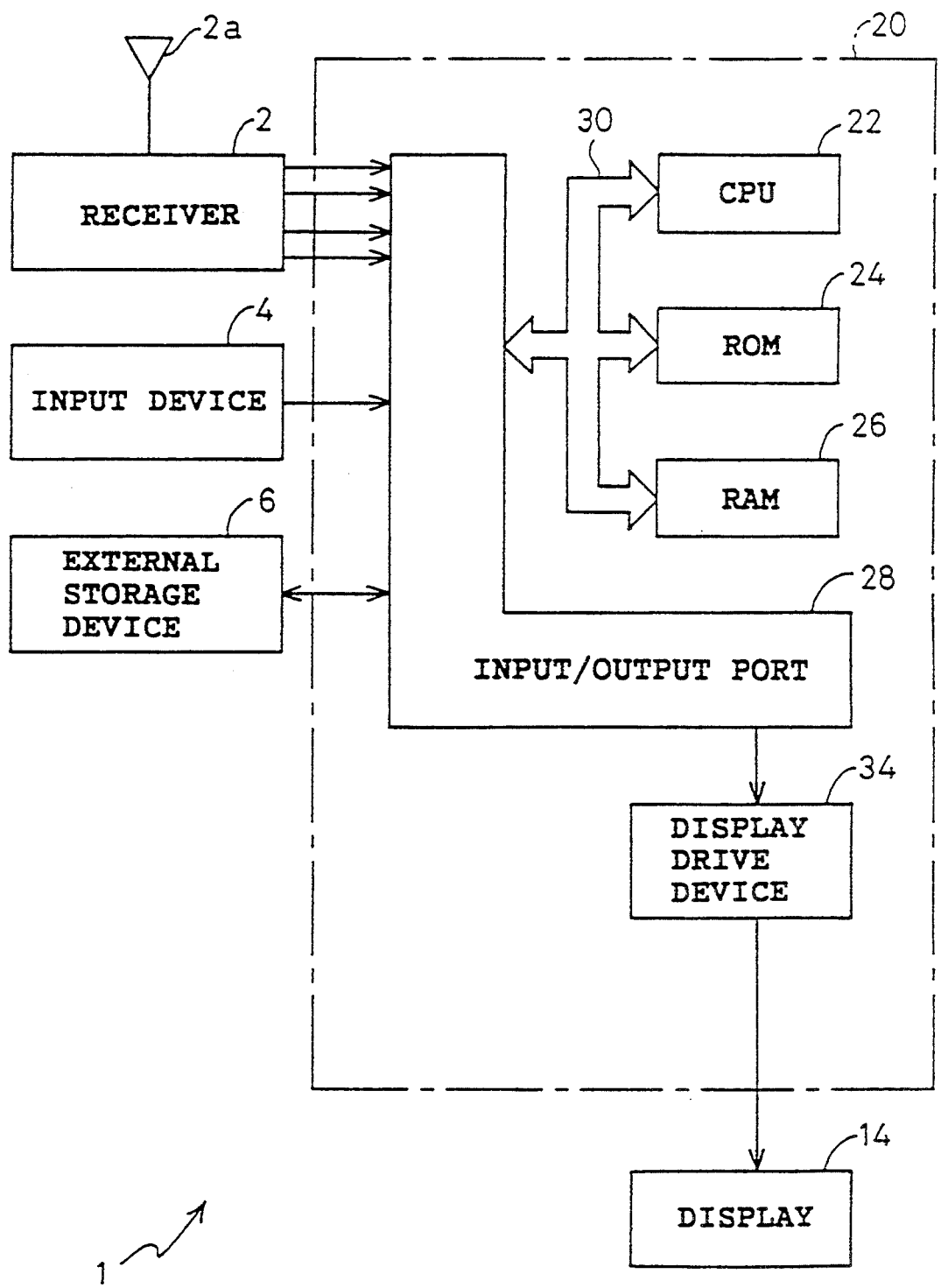
FIG. 2 is a block diagram schematically showing a navigation system of the invention as a whole.

As shown in FIG. 2, a navigation system 1 according to the present embodiment includes an antenna 2a and a known receiver 2 for receiving transmission signals from artificial satellites that are part of the Global Positioning System GPS. Diffusion conversion is performed on the received transmission signal to obtain longitude data, latitude data, and altitude data indicative of the location where the signal is received, i.e. current position of the vehicle.

The navigation system 1 also includes an input device 4 as both the direction input means and route cancel input means for inputting a base point, a driving direction, a cancellation of a determined route and other instructions.

The navigation system 1 also includes an external storage device 6, a display drive device 34, and a display 14. The external storage device 6 may be an optical disk or magnetic disc and serves to store map data. The display 14 may include cathode ray tubes CRT, a liquid crystal screen, or other display means.

The navigation system 1 further includes a main controller 20. The main controller 20 retrieves data from the receiver 2, the input device 4, the external storage device 6 and other parts of the navigation system, and controls the display 14 to indicate a road map and a route determined from the data retrieved.

The external storage device 6 stores map data and intersection data. Specifically, for each intersection the intersection data includes longitude (x-coordinate) and latitude (y-coordinate) data together indicative of the address or location of the intersection of interest, address $C_i$ of an adjacent or next intersection, a node list indicative of an inflection point $N_i$ between the intersection of interest and the next intersection, and road category data indicative of the category of the road between the intersection of interest and the next intersection.

In the instant embodiment, roads are put into three categories of "0", "1", and "2", respectively indicative of highway, turnpike, and other ordinary roadways. The intersection data corresponding to each intersection on the determined route is consecutively marked with register numeral $P_i$ and thus registered as an intersection on the route or "route intersection". Also, the intersection designated as a base point is marked with starting numeral $S_i$, thus identifying the intersection as the base intersection.

The main controller 20 is a known microcomputer including CPU 22, ROM 24, RAM 26, input/output port 28, and bus line 30 connecting these components. The main controller 20 incorporates the display drive device 34 which sends out drive signals to and thereby activates the display 14. In response to instructions input by a user at the input device 4, the main controller 20 executes a corresponding process of either the route determination process, shown in FIGS. 4A and 4B, 5A and 5B and explained later in detail, or the navigation process.

The navigation process is a known process where the current position of a moving vehicle is continually detected and indicated on the area map, and the route determined by the route determination process is indicated on the map to guide a driver. Further details of the navigation process are irrelevant to the present invention and are therefore omitted for simplification.

Figure 4A:
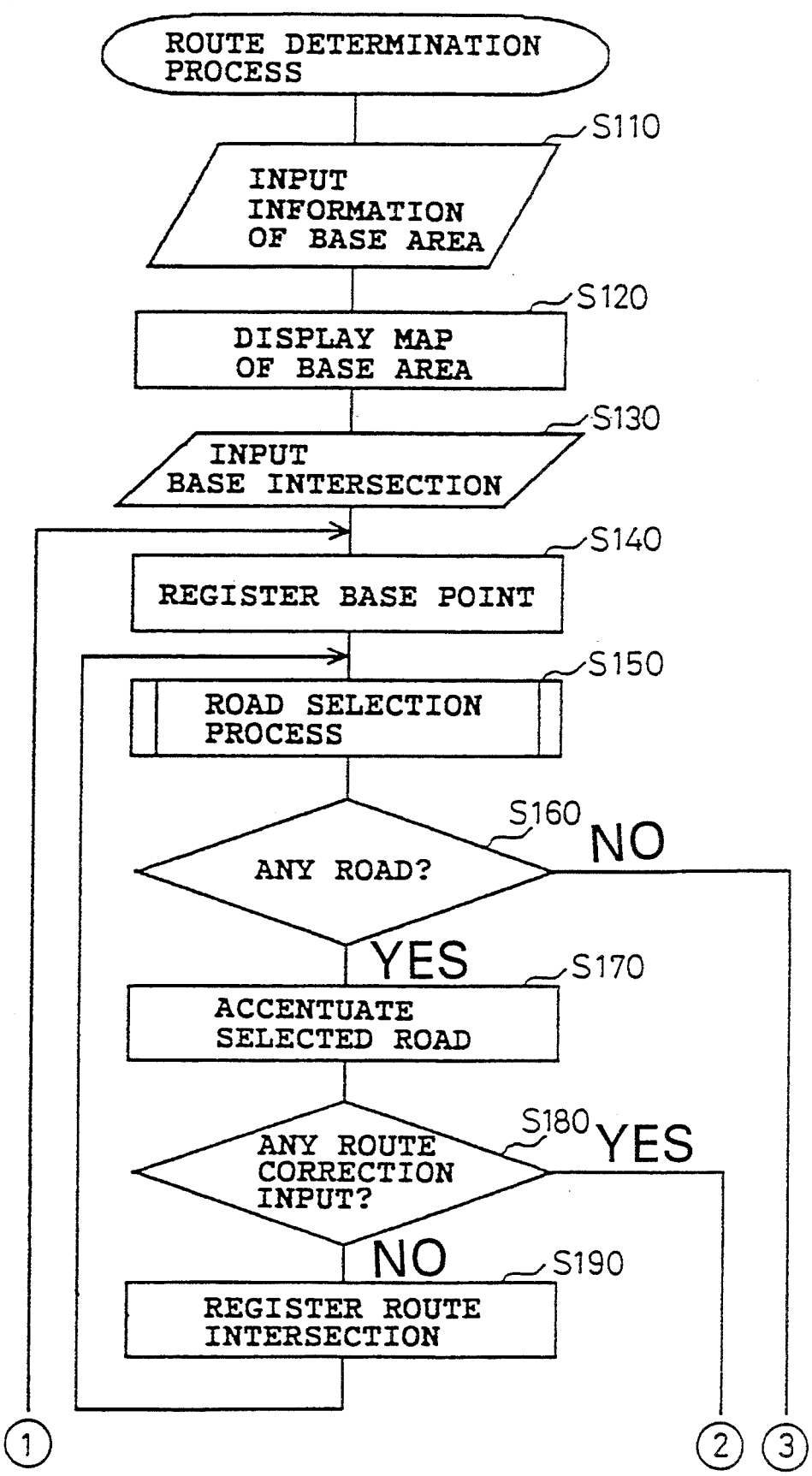
FIGS. 4A and 4B together are a flowchart showing the route determination process performed by a main controller.
Figure 4B:
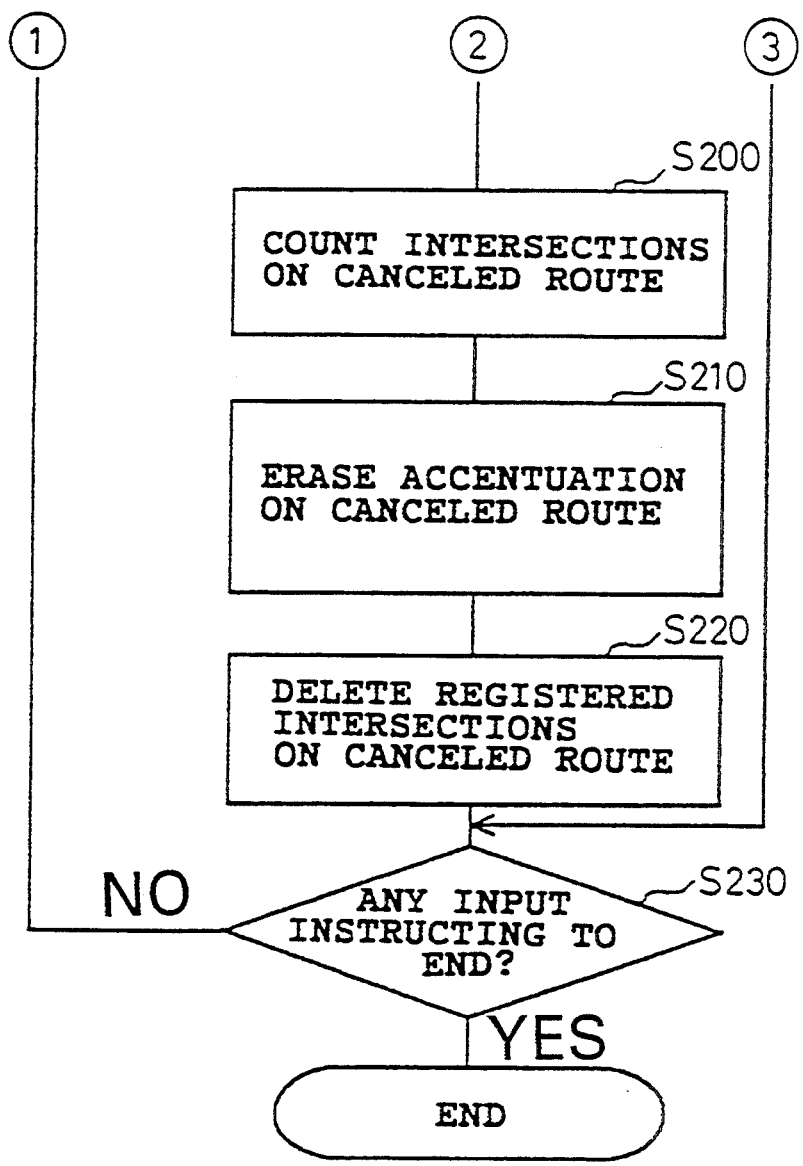

As shown in FIG. 4A, following an instruction to start the route determination process, the information concerning the area from which to start navigation is input at step S110 to provide an area map on which a user locates a base point. In this case, a wide area map may be first displayed, which is next gradually zoomed by pointing with a cursor to obtain a more detailed map on which the user locates and inputs a base point. Alternatively, the information input may be in the form of longitude and latitude value data of the base point, or x-coordinate and y-coordinate data of any landmark buildings nearby the base point.

Figure 6:
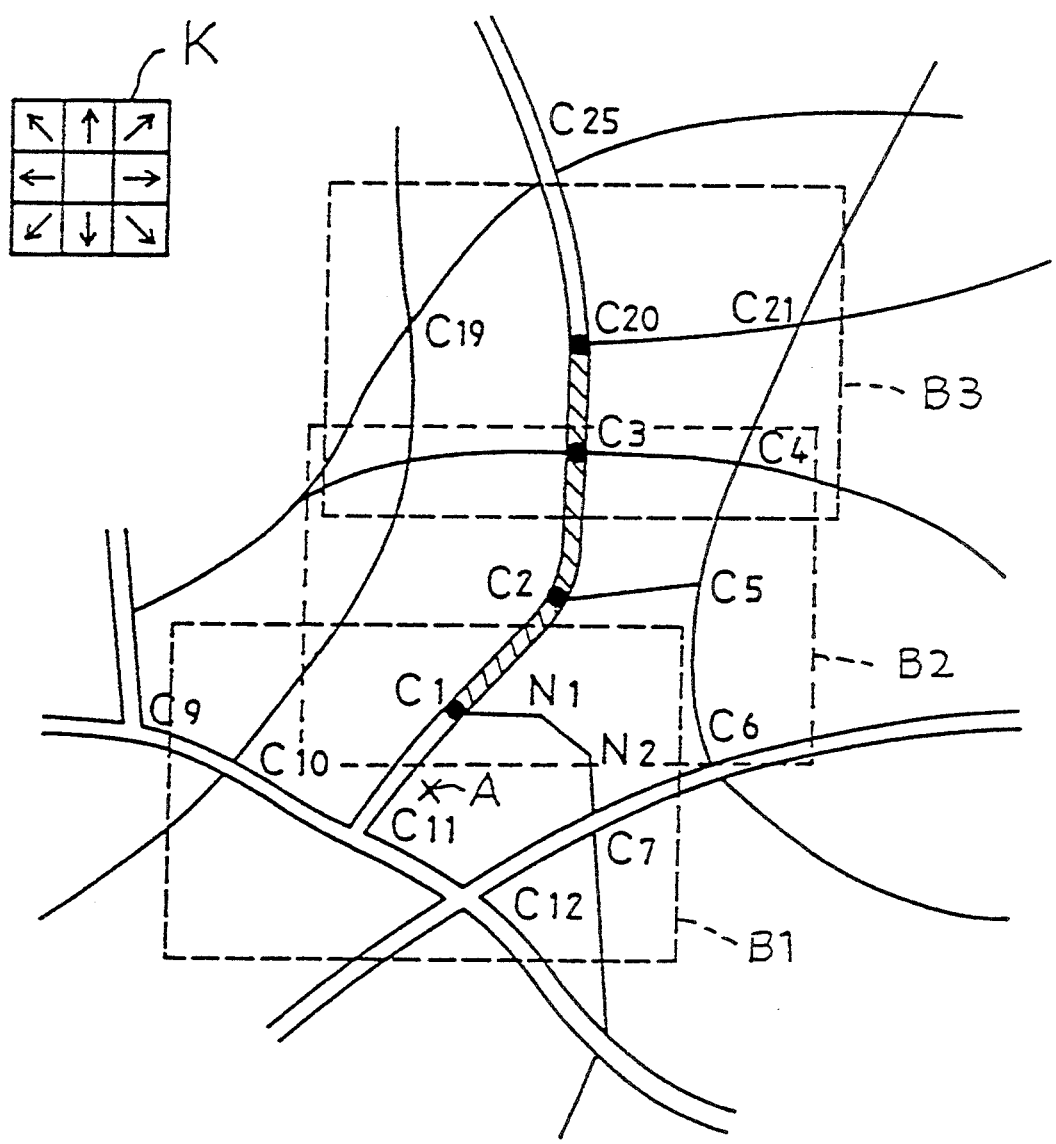
FIG. 6 is an explanatory drawing showing how the determined route is indicated on the map displayed on the screen as a result of the route determination process.

At step S120, based on the information input at step S110 and according to the map data stored in the external storage device 6, area map data is prepared with the base point at its center. A road map is then obtained from the area map and displayed on the display 14. FIG. 6 shows an exemplary case of when the information of point A is input as the base point. As shown in the same figure, a road map of a predetermined range area B1 is displayed on the display 14 with the point A at its center.

At step S130, the location of the intersection where navigation of the vehicle is to be started, i.e. the base intersection, is input by operating arrow keys shown in FIG. 6, thereby placing the cursor on the screen at the desired location and pressing an execute key provided on the input device 4.

At step S140, the base intersection is registered as the base point in determining a route. Specifically, when the intersection C1 on area map B1 shown in FIG. 6 is designated as the base intersection, the intersection data of address C1 shown in FIG. 3 is marked with starting numeral S1 indicative of the base intersection, thereby registering C1 as the base intersection. The intersection data of address C1 is also marked with route intersection numeral P1 indicating that the intersection is on the route which will be determined.

Figure 5A:
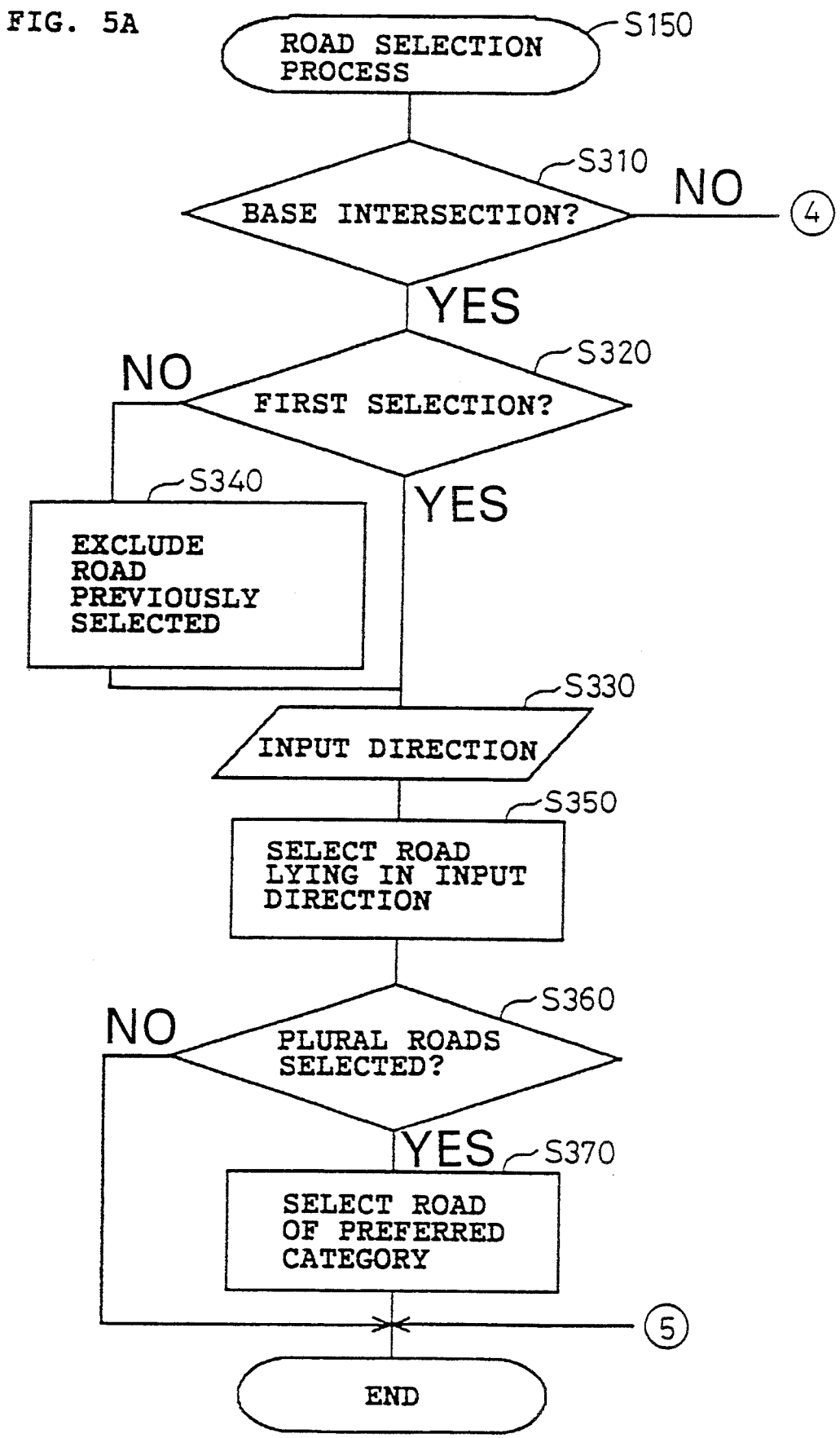
FIGS. 5A and 5B together are a flowchart showing the road selection process effected at step S150 shown in FIG. 4.
Figure 5B:
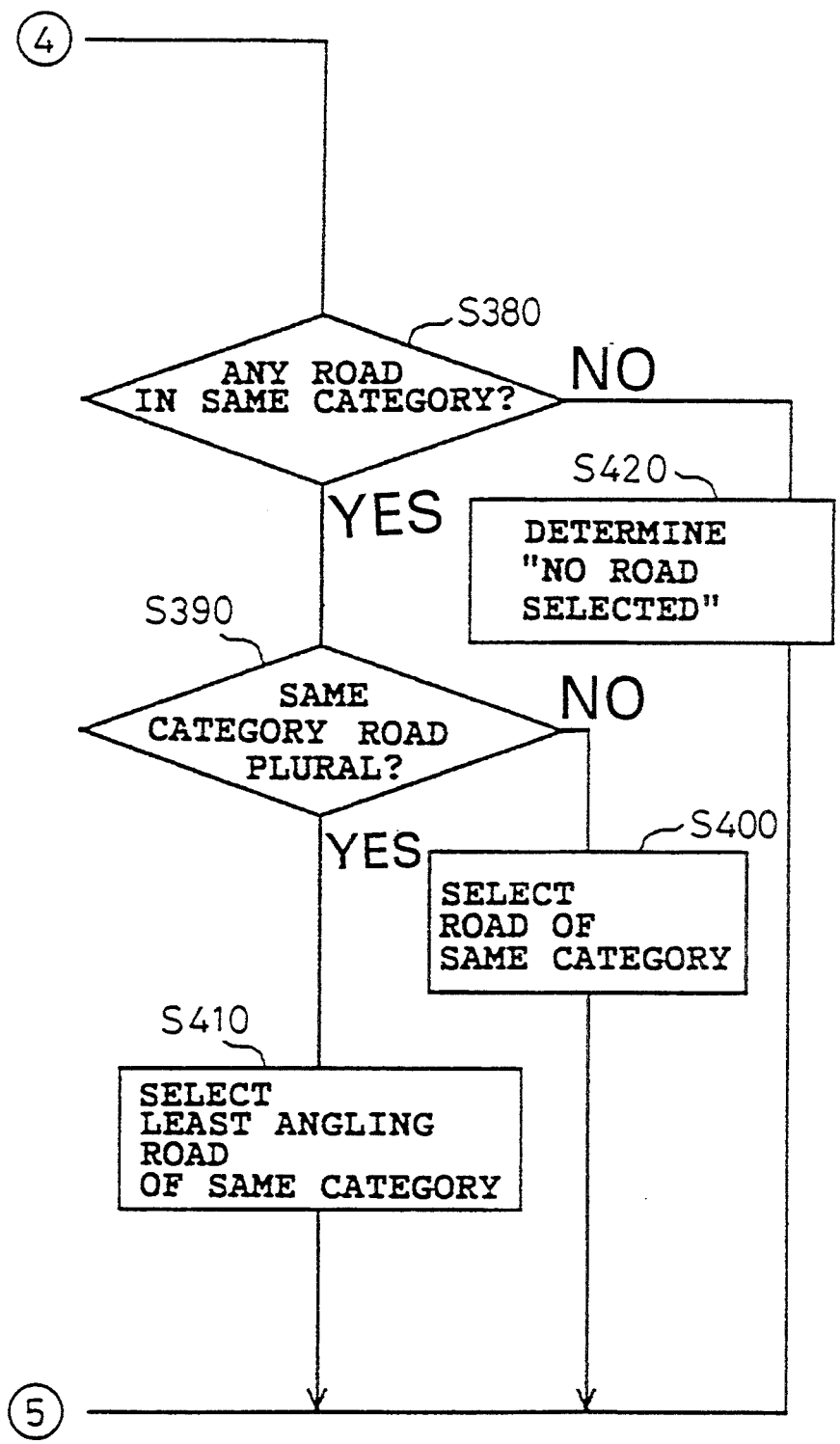

At step S150, the road selection process, shown in more detail in FIGS. 5A and 5B, starts in order to select a road to take from the base intersection or from the intersection at the end of a route determined earlier.

At step S310, it is examined whether the intersection at the end of the determined route is a base intersection. If "YES" is determined, it is next examined at step S320 whether the instant road selection is the first time with respect to this intersection. If "YES" is determined at step S320, the process step proceeds to step S330. If "NO" is determined at step S320, i.e. any road selection has been formerly made for the instant intersection, the road selected at the former selection is excluded, at step S340, from the "candidate" or the roads possible as a route for the instant road selection. The process step then proceeds to step S330.

At step S330, the driving direction from the intersection is input with the arrow keys K, shown in FIG. 6, provided on the input device 4. At the following step S350, any road lying ahead in the input driving direction is selected as a possible route to take from the intersection.

At step S360, it is examined whether a plurality of roads were selected at step S350. If it is determined that only one road has been selected, the process step ends. If it is determined that a plurality of roads have been selected, a road in a preferred road category is selected from the plurality of roads. The preferred road category referred to in this embodiment is predetermined such that a turnpike is preferred to a highway and a highway is preferred to other ordinary roadways.

Referring back to step S310, if it is determined that the intersection registered last as an intersection on the route is not a base point, the process step goes to step S380. At step S380, it is examined whether there is any road of the same category ahead of the intersection. If "NO" is determined at this step, it is conclusively determined at step S420 that no road can be selected, and the process step ends. If "YES" is determined at the step S380, the process step goes to step S390.

At step S390, it is examined whether a plurality of roads in the same category exist. If "NO" is determined, i.e. only one road of the same category exists, that road is selected, at step S400, as the route to take. If "YES" is determined at step S390, the process step goes to step S410 and the road forming the smallest angle relative to the determined route is selected from the plurality of roads and determined as the further route, thereby ending the road selection process.

Thus the road selection process has two different paths of process steps with respect to whether the intersection is a point to start navigation or a mere one of intermediate intersection on the route.

Specifically, the process at steps S320–S370 serves as the first road selection means which selects and determines a road ahead of a base point in the driving direction designated by a user.

On the other hand, the process at steps S380–S410 serves as the second road selection means which selects and determines a road of the same road category as the road determined earlier as the route.

Following the road selection process, the process step goes to step S160 to examine if a road has been selected by the road selection process. If "YES" is determined at step S160, the process proceeds to step S170 of a route indication control means where the determined route to the next intersection on the road map is indicated on the display 14. The route may be indicated in various ways, such as accentuation by varied boldness of lines, color, and the type of lines.

If the next intersection is beyond the display frame of the map currently shown on the display 14, the display frame is changed so as to situate the next intersection at its center, thereby an attaining indication of the route. For instance, the road between the base intersections C1 and C2 shown in FIG. 6 extends beyond the display frame B1. Therefore, upon receipt of the input designating that the driving direction is toward the right above of the base intersection C1, the display frame B1 is changed to the display frame B2 with the intersection C2 at its center. The road between the base intersection C1 and the intersection C2 is then accentuated on the display frame B2, thereby indicated as the route.

Upon indication of the route, it is examined at step S180 whether or not any instruction to cancel the route has been input. Cancellation of a route is input by operating a cancel key provided on the input device 4 a desired number of times corresponding to the number of intersections to be canceled. If it is determined at step S180 that no cancellation instruction has been input, the intersection at the end of the accentuated roads is marked with register numeral Pi, thereby registered as a route intersection, and the process step goes back to step S150.

If it is determined at step S180 that any cancellation of the route has been instructed, the number of times the cancel key was operated, i.e. the number of the intersections to be canceled, is counted at step S200. At the following step S210, the corresponding number of road accentuations is erased. The process then goes to step S220 in which the route cancel control means deletes the registration of the intersections on the canceled roads.

If, at step S210, the current display frame of display 14 has no more intersections still registered as route intersections, the display frame is changed backward so as to display a road map having the last intersection on the route that was not canceled situating at its center, and then the indication of the canceled route is erased toward the last intersection.

Thus, both the process at steps S200–S220 of canceling the determined route and the process at step S160 of determining "NO" are followed by the process step S230.

At step S230, it is examined if there is any input instructing to end the route determination process. If "YES" is determined, it is determined that the route determination is finished and the process ends. If "NO" is determined at step S230, the process goes back to step S140. The process step S140, this time serving as route determination resumption means, registers the last remaining intersection on the determined route as a base intersection, and the process at step S150 et seq. are then repeated.

Explained hereafter are the procedures to determine a route with the navigation system constructed in the manner described above.

Information concerning a base point is first input. In response to this information, a road map covering the base point is displayed on the display device 14, as a result of the process at steps S110 and S120.

An intersection positioned close to the base point is next input by placing a cursor on the screen at the intersection. The driving direction of the vehicle is also input. In response to this information, the process at step S150 is effected and a road running in the input direction is selected and determined as a route.

Subsequently, the process at steps S160–S190 and at step S150 are repeated, thereby consecutively determining roads of the same category as a route from the base point toward a destination, intersection by intersection.

A user can view the proceeding of the route determination process on the display 14. Should a route determined deviate from a desired one, the determined route can be corrected by instructions from the input device 4. In response to this instruction, the process steps at S200-S220 are effected. Specifically, automatic operation of the route determination is stopped, the road determined is canceled, intersection by intersection, from the last one to those determined earlier, and an indication corresponding to the canceled route is deleted on the display 14.

When cancellation of a route is effected or when automatic determination of a route cannot be executed due to the difference of road category lying ahead of the intersection, the present navigation system enters into a standby condition awaiting input of the driving direction. Upon receipt of this information, the navigation system resumes a route determination, recognizing the last intersection that is not canceled as the base intersection, and continues the automatic route determination unless a route cannot be determined due to the difference of road category or an instruction is received to correct the determined route.

Thus, in the present navigation system, a user can view operation of automatic route determination. Should the route determined deviate from a desired route, the route determination process can be immediately stopped and the route can be corrected. Thus, a route as desired can be readily and quickly determined.

Further, if the route determined extends beyond the current display frame, the display frame is changed from B1 to B2 and from B2 to B3 toward the destination so as to situate at its center the last intersection of the determined route.

Therefore, even if the destination is distant from the base point and beyond the display frame currently shown on the display 14, the display frame of the present navigation system catches up with the automatic route determination such that a user can check the route being determined. Easy and correct route determination is thus attained. Accordingly, the present navigation system proves to be especially useful when applied in route determination for long distance driving using, for instance, turnpikes.

This invention has been described above with reference to a preferred embodiment as shown in the drawings. Modifications and alterations may become apparent to one skilled in the art upon reading and understanding the specification. Despite the use of the embodiment for illustration purposes, it is intended to include all such modifications and alterations within the scope and the spirit of the appended claims.

In this spirit, it should also be noted that the following peripheral functions can be attained and therefore are included in the present invention.

Since a route is determined with respect to each intersection in the present embodiment, the distance between the base point and the destination can be readily and correctly obtained by adding up the distance between intersections every time an intersection is registered on the route. Similarly, during driving, the remaining distance to go from the current position may be computed and indicated.

Further, since the automatic determination of the route can be stopped at a desired point, any desired subsidiary information, such as famous viewpoints or the residence of an acquaintance nearby, may be input at the desired point. The subsidiary information may be indicated on the display 14 or announced during driving navigated by the present system.

Wherefore, having described the present invention, what is claimed is:

1. A navigation system comprising:
   a) display means for displaying a road map thereon;
   b) road map data storage means for storing road map data to be displayed on said display means, said road map data including road category data indicative of a category type of each road;
   c) display control means for controlling said display means to display said road map according to said road map data stored in said road map data storage means;
   d) input means for inputting a base point and a driving direction;
   e) first road selection means for determining based on said base point and driving direction a road, from said base point to an intersection substantially in said driving direction, to be taken on a route;
   f) second road selection means for selecting, according to said road map data and the road category type of the determined road, a next road to be taken on said route from the end of the determined road to a next intersection based on said input driving direction;
   g) route indication control means for controlling said display means to indicate on said displayed road map said route determined by said first and second road selection means;
   h) determination means for determining whether said next road from the end of the determined road to said next intersection was selected by said second road selection means and, if said next road from the end of the determined road to said next intersection was selected, causing said second road selection means to operate to determine a further next road, to be taken on said route from the end of said next road to a further next intersection based on said input driving direction;
   i) route cancel input means for receiving an instruction inputted by a user to stop determination of said route by said first and second road selection means; and j) route cancel control means, responsive to said instruction inputted by the user to stop determination of said route, for canceling at least a portion of the determined route, intersection by intersection, from the end of the determined route toward said base point and for erasing the canceled portion of said route on said displayed road map.

2. A navigation system according to claim 1, wherein an antenna is coupled to a receiver for receiving a transmission signal, and said receiver is coupled to said navigation system so as to send the received transmission signal to a central processing unit incorporated in said navigation system for determining a position of a vehicle operated by the user.

3. A navigation system according to claim 2, wherein said navigation system further comprises a main controller including:
   a) said central processing unit for processing information;
   b) a ROM for storing information;
   c) a RAM for storing information:
   d) an input/output port for inputting and outputting information; and
   e) a bus line interconnecting said central processing unit, said RAM, said ROM and said input/output port with one another;
   said navigation system further includes an input device including said input means for facilitating the inputting of information by the user; and said main control is coupled to both said receiver and said input device through said input/output port.

4. A navigation system according to claim 1, wherein said navigation system further comprises:
   route determination resumption means for causing said first road selection means to resume operation from the end of an uncancelled portion of the determined route when one of:
   (1) a further input is received designating a driving direction;
   (2) said determination means determines that said second road selection means can not determine said further next road;
   and (3) said route cancel control means has finished canceling the determined route in response to said inputted instruction.

5. A navigation system according to claim 1, wherein said road map data storage means is one of an optical disk and a magnetic disk and said display means is one of a cathode ray tube and a liquid crystal screen.

6. A navigation method comprising the steps of:
   a) storing road map data including road data indicative of a category of each road contained in the road map data in road map data storing means;
   b) displaying a road map according to said road map data on a road map display;
   c) inputting a base point and a driving direction;
   d) selecting based on said base point and driving direction a road via a first road selection means from said base point to an intersection, which lies substantially in said input driving direction from said base point, as a road to be taken on a route;
   e) indicating said selected road on said displayed road map;
   f) selecting based on said driving direction a next road via a second road selection means, from the end of said selected road to a next intersection substantially in the driving direction, to be taken on said route;
   g) indicating said next road to be taken on said route on said displayed road map; and
   h) repeatedly selecting based on said driving direction a further road to be taken on said route via said second road selection means from the end of a previously selected road to a further intersection substantially in the driving direction until one of: an instruction to stop said route selection is given; and a further road substantially in the driving direction cannot be selected;
   wherein said step of selecting the road from said base point to said intersection to be taken on said route comprises the steps of:
   i) selecting all roads from said base point to any intersection substantially in the driving direction from said base point;
   j) determining if there are a plurality of selected roads; and
   k) if, a plurality of roads are selected, choosing a road, from said plurality of selected roads, assigned a preferred category of road designation as said selected road to be taken on said route; if only a single road is selected, selecting the single road as said selected road to be taken on said route; and if no road is selected, entering a standby condition to await input of a new driving direction.

7. A navigation method according to claim 6, further comprising the step of:
   a) determining, with a determination mechanism, whether said next road from the end of the determined road to said next intersection was selected by said second road selection means and, if said next road from the end of the determined road to said next intersection was selected, causing said second road selection means to operate to determine said further road, to be taken on said route from the end of said next road to said further next intersection;
   b) receiving, via a route cancel input device, an instruction to stop determination of said route by said first and second road selection means; and
   c) canceling, in response to said instruction to stop determination of said route, at least a portion of the determined route, via a cancel control device, intersection by intersection from the end of the determined route toward said base point and erasing the canceled portion of said route on said displayed road map.

8. A navigation method comprising the steps of:
   a) storing road map data including road data indicative of a category of each road contained in the road map data in road map data storing means;
   b) displaying a road map according to said road map data on a road map display;
   c) inputting a base point and a driving direction;
   d) selecting based on said base point and driving direction a road via a first road selection means from said base point to an intersection, which lies substantially in the driving direction from said base point, as a road to be taken on a route;
   e) indicating said selected road on said displayed road map;
   f) selecting based on said driving direction all next roads via a second road selection means from the end of the selected road to any next intersection substantially in the driving direction;
   g) determining if any of the selected next roads are assigned a same category of road designation as the previously selected road and, if none of the selected next roads have the same category of road designation as the previously selected road, then determining that no road can be selected and entering a standby condition to await input of a new driving direction;

h) if, only a single next selected road has the same category of road designation as the previously selected road, selecting the single next selected road as a next road to be taken on said route;

i) if, a plurality of said selected next roads have the same category of road designation, selecting the one of said next selected roads that forms the smallest angle relative to said previously selected road as said next road to be taken on said route; and j) indicating said next road to be taken on said road map display.

9. A method of navigating according to claim 8, further comprising the step of repeatedly selecting based on said driving direction a further road via said second road selection means from the end of a previously selected road to a further intersection substantially in the driving direction as a further road to be taken on said route until one of: an instruction to stop the route selection is received; and a further road substantially in the driving direction cannot be selected.

10. A navigation method according to claim 8, further comprising the step of:

a) determining, with a determination mechanism, whether said next road from the end of the determined road to said next intersection was selected by said second road selection means and, if said next road from the end of the determined road to said next intersection was selected, causing said second road selection means to operate to determine a further next road, to be taken on said route from the end of said next road to a further intersection;

b) receiving, via a route cancel input device, an instruction to stop determination of said route by said first and second road selection means; and c) canceling, in response to said instruction to stop determination of said route, at least a portion of the determined route, via a cancel control device, intersection by intersection from the end of the determined route toward said base point and erasing the canceled portion of said route on said displayed road map.

11. A navigation method comprising the steps of:

a) storing road map data including road data indicative of a category of each road contained in the road map data in road map data storing means;

b) displaying a road map according to said road map data on a road map display;

c) inputting a base point and a driving direction;

d) selecting based on said base point and driving direction a road from said base point to an intersection, which lies substantially in the driving direction from said base point, as a road to be taken on a route;

e) indicating said selected road on said displayed road map;

f) selecting based on said driving direction a next road, from the end of said selected road to a next intersection substantially in the driving direction, to be taken on said route;

g) indicating said next road to be taken on said route on said displayed road map; and h) repeatedly selecting based on said driving direction a further road to be taken on said route from the end of a previously selected road to a further intersection substantially in the driving direction until one of: an instruction to stop said route selection is given; and a further road substantially in the driving direction cannot be selected;

i) stopping the selection of said route to be taken upon receipt of said instruction to stop said route selection;

j) canceling, upon receipt of an instruction to cancel a desired portion of said selected route, at least a portion of said selected route from the end of said selected route towards said base point, intersection by intersection, until the desired portion of said selected route has been canceled; and k) erasing the indication of the canceled portion from said road map display.

12. A navigation method according to claim 11, further comprising the step of resuming the road selection process from the end of the remaining portion of said selected route upon inputting a new driving direction.

* * * * *